July 22, 1924. Re. 15,875
A. L. HOWARD
PHONOGRAPH
Original Filed April 22, 1920 2 Sheets-Sheet 1
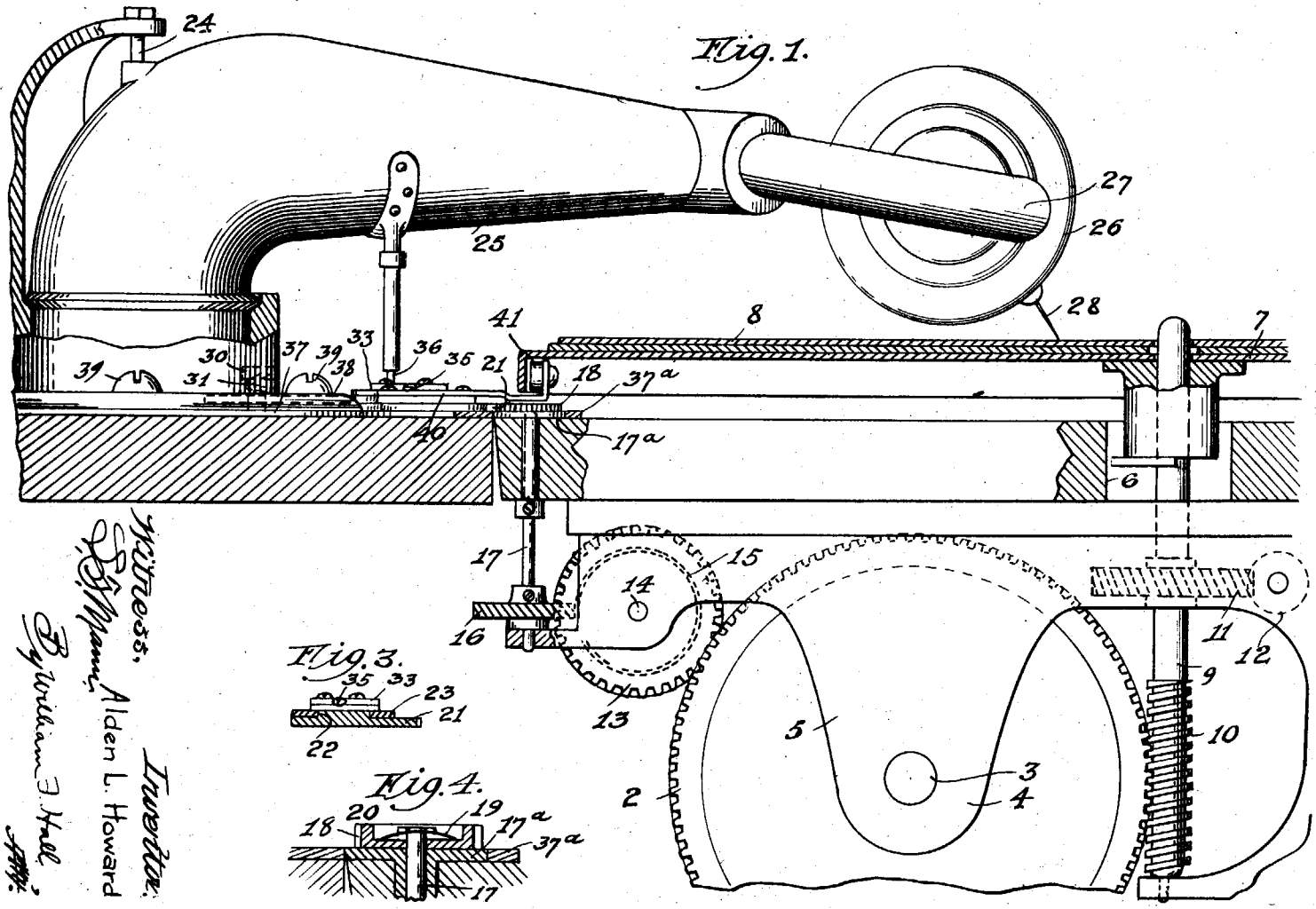
Witness, F. S. Mann.
Inventor: Alden L. Howard
By William F. Hall, Atty.

July 22, 1924. Re. 15,875
A. L. HOWARD
PHONOGRAPH
Original Filed April 22, 1920 2 Sheets-Sheet 2
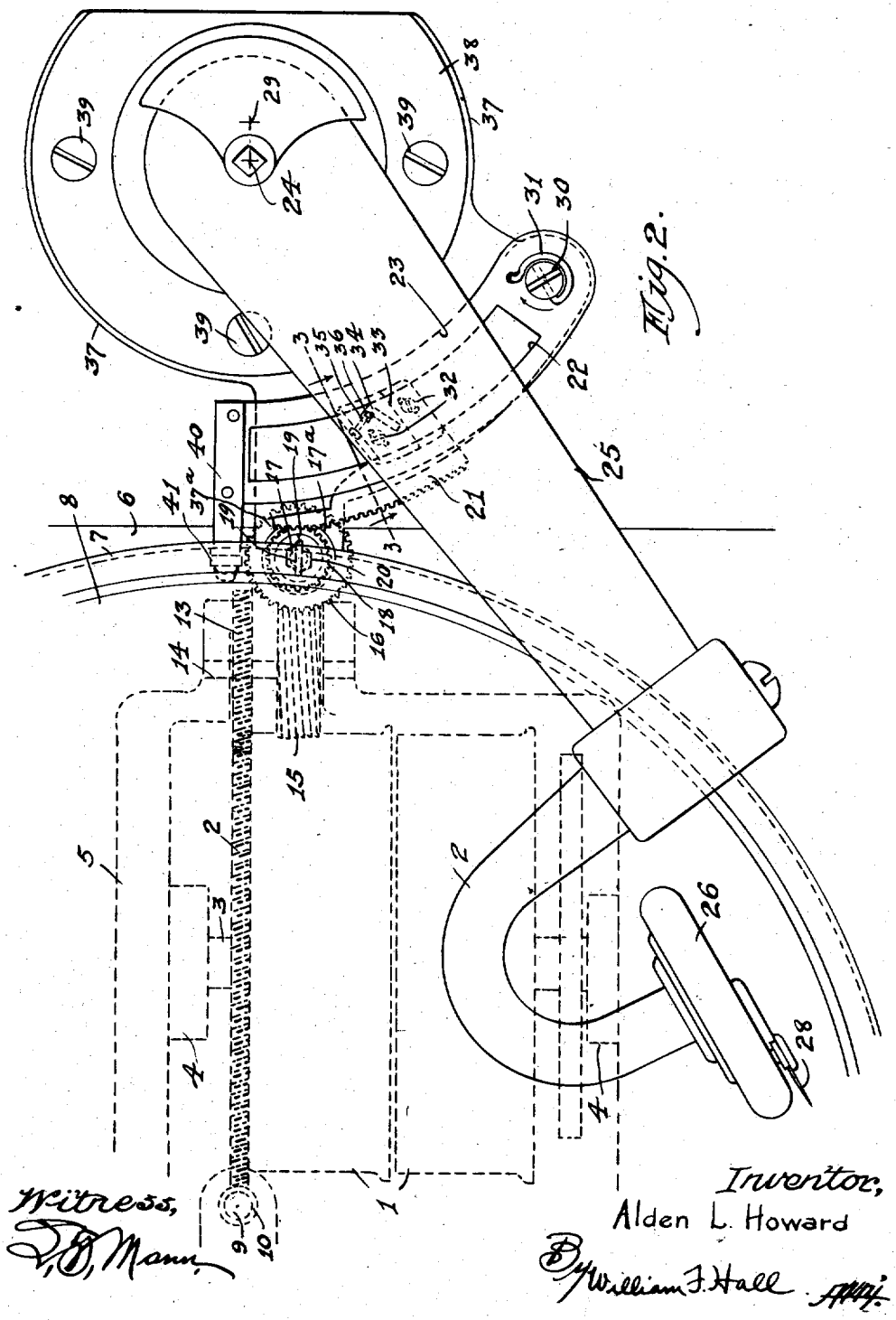

Reissued July 22, 1924. Re. 15,875

UNITED STATES PATENT OFFICE.

ALDEN L. HOWARD, OF ANN ARBOR, MICHIGAN.

PHONOGRAPH.

Original No. 1,369,280, dated February 22, 1921, Serial No. 375,686, filed April 22, 1920. Application for reissue filed November 4, 1921. Serial No. 512,923.

*To all whom it may concern:*

Be it known that I, ALDEN L. HOWARD, a citizen of the United States, residing in the city of Ann Arbor, county of Washtenaw, and State of Michigan, have invented certain new and useful Improvements in Phonographs, of which the following is a specification.

My invention relates to improvements in phonographs and relates more particularly to a starting and stopping device for phonographs using the disc type record.

Among its salient objects are to provide a device or attachment which automatically starts the record disc to rotating when the reproduction horn is in position for the needle to be placed upon the record, and automatically stops the record disc when the record has been completed; to provide a device that is adapted to be mounted on any type of disc machine, one that is positive in its operation, simple in construction, besides having the working parts conveniently positioned for adjustment; to provide a device that may be permanently adjusted due to the fact that there is practically no wear upon the actuating mechanism; to provide an attachment that is quickly detachable from the machine by removing a single plate upon which the exposed mechanism is mounted and in general to provide a device of the character hereafter referred to.

In the drawings:

Fig. 1 is a fragmentary edge view of the mechanism of a disc type phonograph with parts broken away and parts shown in section.

Fig. 2 is a plan view of substantially that part of the mechanism shown in Fig. 1.

Fig. 3 is a detail view taken on line 3—3 of Fig. 2, looking in the direction of the arrow.

Fig. 4 is a detail view of the pinion which meshes with the rack shown in Fig. 2.

Referring to the drawings, only that part of the mechanism of a disc type phonograph is shown as is particularly related to the automatic starting and stopping device. Two large springs shown at 1 furnish power for the driving motor. These springs together with the large helical gear 2 are mounted upon a shaft 3, which is carried by suitable bearings 4. These bearings are part of a frame 5, which is fixedly attached to the upper table portion 6. The disc 7 which carries the record 8 is rotated by means of a vertical shaft 9 upon which is cut a worm 10, which meshes with the helical gear 2. The speed of the shaft and the disc is regulated by means of a governor (not shown) driven through the gear 11 and worm 12. A helical gear 13, which meshes with the larger gear 2 of a similar character, is mounted in shaft 14, the latter being also carried by the frame 5. To this shaft 14 is also fixed a worm 15, which drives a horizontally positioned gear 16. The gear 16 is mounted on a vertical shaft 17 to which is also rotatably mounted on the top thereof a pinion 18. The top of the vertical shaft 17 is slotted as shown at 19 and in this slot is placed a light flat friction spring which is held in place by means of the nut 20. This spring is slightly bowed and either end slightly twisted longitudinally in opposite directions so that with the setting up of the nut, the ends of the spring will frictionally contact the top of the pinion 18 when it is rotated in a counterclockwise direction and turn freely when rotating in a clockwise manner. The friction caused by this spring is hardly perceptible but it is sufficient to positively actuate the mechanism. The pinion 18 meshes with a rack 21, which is an integral part of the member sliding in the central slot 22 of the arc 23. The arc upon which the rack is cut is centered at 24, as is the reproducing arm 25, which is connected to the sounding box 26 by means of a curved tube connection 27. This curved tube may be rotated so as to raise and lower the sounding box and needle 28 from contact with the record. The arc 23 on the other hand, in which is slidably mounted the rack 21 is centered at 29. This arc is pivoted at 30 and a rotative tension in the direction of the arrow is constantly held upon the arc by means of the coil spring 31.

Adjustably fixed by means of the set screws 32, to the top of the rack member 21, and sliding with it in the slot 22, is a plate member 33. In this plate member is cut an L-shaped slot 34 and into the shorter portion of this slot is screwed a set screw 35, which is adapted to regulate the length of the slotted portion or more properly, the width of the shoulder upon which the vertical pin 36 may rest. This vertical pin is riveted to the sound tube 25 as shown in Fig. 1. The lower portion of this pin or that portion which rests upon the shoulder of the L-slot is squared so that its dropping from the shoulder into the longer portion of the slot is instantaneous.

The mechanism is simply mounted upon the top surface of any disc machine as the plate 37 is fitted beneath the flange 38 of the sound arm and is held in place by the screws 39. This plate fixes the center 24 for the rack and has upon its surface a hole in which is set the pivot screw 30 for the arc 23. An extended portion 37ª of the plate 37 is apertured to fit over the sleeve bearing 17ª as shown in Fig. 4. In this manner, besides fixing the centers of the rack and eccentrically arranged arc, the center of the pinion 18, by means of the extension of the plate, is set relative therewith. At the end of the arc 23 is fixedly attached a narrow plate 40, upon which is fixed the leather or rubber stop 41. This stop is adapted to contact the inner circumference of the disc 7 and prevent its rotation.

The operation of the device is as follows: When the sound tube 25, together with the sound box 26, are rotated upon their pivot 24 to place the needle upon the outer edge of the record in beginning a selection, the pin 36 will drop into the longer portion of the slot 34, due to the eccentric arrangement of the arc 23, and the tension held upon the arc by means of the coil spring 31. As the tube is moved to the outer edge of the record, the rack and plate member 33 slide in the slot 22, drawing the arc 23, towards the disc 7 against the tension of the spring 31. The moving of this arc towards the disc will draw the stop 41 from contact with the disc and automatically release the disc so that it may rotate. At this time, the rack will be out of mesh with the pinion 18. As the needle moves horizontally across the face of the record, the rack and pinion will mesh and as the pinion 18 is geared from the motor to rotate in timed relation with the travel of the needle across the record, the movement of the rack and pinion is practically identical. To allow for any difference in the movement of these two members, I have frictionally mounted the pinion as previously explained. With the starting of the disc, the pin 36 is positioned upon the shoulder of the slot 34 as is shown in Fig. 2, and remains in this position until the needle has advanced to the end of the selection. At this time, the sound arm will become stationary as the needle is riding continuously in an endless groove in the record. The pinion, however, which is driven from the motor, continues to rotate and meshing with the rack causes it to move as before. The continued movement of the rack causes the pin to drop from the shoulder of the L-slot, thereby permitting the coil spring 31 to take effect and throw the stop 41 in contact with the edge of the disc. The length of time which the disc and record are allowed to rotate after the completion of the selection may be regulated by restricting the size of the shoulder upon which the pin 36 rests by means of the set screw 35.

It will be seen from this that by merely placing the sound box in position at the edge of the disc or record, the latter will immediately commence to rotate and will continue to rotate until the selection has been completed or the needle has become stationary upon the record.

I claim as my invention:

1. In an automatic starting and stopping device for phonographs, the combination with a rotating disc and reproducing mechanism adapted to progress horizontally across substantially one half of the disc during its rotating period, of an automatically actuated arc adapted to frictionally contact the disc, operative connections between the reproducing mechanism and the arc for automatically starting and stopping the rotation of the disc.

2. In an automatic starting and stopping device for phonographs, the combination with a rotating disc and reproducing mechanism adapted to ride horizontally across substantially one half of the disc during its rotating period, of an automatically actuated arc adapted to frictionally contact the disc, operative connections between the reproducing mechanism and the arc operating to start the disc when the reproducing mechanism is in position near the circumference of the disc, and to stop the disc when the reproducing mechanism is positioned near the center of the disc.

3. In a starting and stopping device for phonographs, the combination with a rotating disc, of a reproducing mechanism adapted to move horizontally across substantially one half of the disc during the rotating period, an automatically actuated arc eccentrically positioned with reference to said reproducing mechanism and adapted to frictionally contact the disc, operative connections between the reproducing mechanism and the arc for automatically starting and stopping the rotation of the disc.

4. In a starting and stopping device for phonographs, the combination with a rotating disc, of a reproducing mechanism adapted to move horizontally across substantially the radius of the disc during the rotating period, an automatically actuated arc adapted to frictionally contact the rotating disc, having a sliding member therein, moving in timed relation with the reproducing mechanism, operative connections between the sliding member of the arc and the reproducing mechanism for automatically starting and stopping the rotation of the disc.

5. In an automatic starting and stopping device for phonographs, the combination with a rotating disc, of a reproducing mechanism adapted to progress across the face of the disc during its rotating period, an automatically actuated mechanism for controlling the starting and stopping of the disc, operative connections between the reproducing mechanism and said automatically actuated mechanism for automatically controlling the starting and stopping of the rotation of the disc with the lateral movement of the reproducing mechanism.

6. In a starting and stopping device for phonographs, the combination with a rotating disc, of a reproducing mechanism adapted to move across the face of the disc, automatically actuated mechanism adapted to control the starting and stopping of the disc and moving in timed relation with the reproducing mechanism, and operative connections between said automatically actuated mechanism and the reproducing mechanism for automatically starting and stopping the rotation of the disc with the lateral movement of the reproducing mechanism.

7. In an automatic starting and stopping device, the combination with a rotating disc and reproducing mechanism adapted to progress horizontally across substantially one-half of the disc during the rotating period, an automatically actuated member eccentrically positioned with reference to the pivotal mounting of the reproducing mechanism, operative connections between the reproducing mechanism and the actuating member for automatically starting and stopping the rotation of the disc.

8. In an automatic starting and stopping device, the combination with a rotating disc and reproducing mechanism adapted to progress horizontally across substantially the radius of the disc during the rotating period, an automatic actuated pivoted member having an element slidably mounted therein and moving in timed relation with the reproducing mechanism, operative connections between the sliding element of the pivoted member and the reproducing mechanism for automatically starting and stopping the rotation of the disc.

ALDEN L. HOWARD.